United States Patent
Hynecek et al.

(10) Patent No.: US 10,743,630 B2
(45) Date of Patent: Aug. 18, 2020

(54) DUAL-LAYER BUMPER FOR A CASE FOR A MOBILE DEVICE

(71) Applicant: Samsonite IP Holdings S.àr.l., Luxembourg (LU)

(72) Inventors: Bryan Lee Hynecek, Redwood City, CA (US); Randy Yang Chiang, San Mateo, CA (US); Jon Dukershein, Pacifica, CA (US); Darrick Del Moral, San Bruno, CA (US); David Willson, San Francisco, CA (US); Alan Ng, San Francisco, CA (US)

(73) Assignee: Samsonite IP Holdings S.àr.l., Luxembourg (LU)

( * ) Notice: Subject to any disclaimer, the term of this patent is extended or adjusted under 35 U.S.C. 154(b) by 15 days.

(21) Appl. No.: 15/699,754

(22) Filed: Sep. 8, 2017

(65) Prior Publication Data

US 2019/0075899 A1    Mar. 14, 2019

(51) Int. Cl.
*A45C 11/00*  (2006.01)
*B29C 45/16*  (2006.01)

(52) U.S. Cl.
CPC ......... *A45C 11/00* (2013.01); *A45C 2011/002* (2013.01); *B29C 45/1676* (2013.01)

(58) Field of Classification Search
CPC .............. A45C 11/00; A45C 2011/002; A45C 2011/003; A45C 2011/001; H01B 1/3888; H04B 1/3888; B65D 81/02; B65D 81/022
USPC ........................................ 206/320; 455/575.8
See application file for complete search history.

(56) References Cited

U.S. PATENT DOCUMENTS

| | | |
|---|---|---|
| 5,265,720 A | 11/1993 | Meliconi |
| 7,093,717 B2 | 8/2006 | Sakai et al. |
| D662,929 S | 7/2012 | Fahrendorff et al. |
| D669,458 S | 10/2012 | Wilson et al. |
| D671,930 S | 12/2012 | Akana et al. |
| D674,789 S | 1/2013 | Wen |

(Continued)

FOREIGN PATENT DOCUMENTS

| KR | 200472205 Y1 | 4/2014 |
|---|---|---|
| KR | 101422194 B1 | 7/2014 |

(Continued)

OTHER PUBLICATIONS

Extended European Search Report and Written Opinion for EP Application No. 18193164.3, dated Feb. 12, 2019.

(Continued)

*Primary Examiner* — Steven A. Reynolds
(74) *Attorney, Agent, or Firm* — Lerner, David, Littenberg, Krumholz & Mentlik, LLP (57) ABSTRACT

A bumper (1) for a mobile device that includes a first layer (18) formed from an elastomeric first material and a second layer (2) formed from a second material different from the elastomeric first material. The first layer (18) is arranged on an outside of the bumper and the second layer (2) is arranged on an inside of the bumper so that the second layer (2) is between the mobile device and the first layer (18) when the mobile device is arranged in the bumper (1). The bumper (1) completely covers the mobile device, except for at least a portion of the front, at least a portion of the rear, and at least one speaker of the mobile device if present, when the mobile device is arranged in the bumper (1).

20 Claims, 5 Drawing Sheets

(56) References Cited

U.S. PATENT DOCUMENTS

| | | |
|---|---|---|
| D679,695 S | 4/2013 | Fahrendorff et al. |
| 8,490,783 B1 | 7/2013 | Fan |
| 8,579,112 B2 | 11/2013 | Bethea |
| D696,238 S | 12/2013 | Murchison et al. |
| D696,240 S | 12/2013 | Kim et al. |
| 8,596,449 B2 | 12/2013 | Mongan et al. |
| 8,655,422 B2 | 2/2014 | Stiehl et al. |
| 8,708,140 B2 | 4/2014 | Liu |
| 8,718,731 B1 | 5/2014 | Tang |
| D706,255 S | 6/2014 | Akana et al. |
| 8,755,852 B2 | 6/2014 | Hynecek et al. |
| 8,770,402 B2 | 7/2014 | Bergreen et al. |
| 8,887,903 B2 | 11/2014 | Diebel et al. |
| D719,559 S | 12/2014 | Dukerschein et al. |
| D720,735 S | 1/2015 | Turocy |
| D721,360 S | 1/2015 | Laffon de Mazieres et al. |
| D721,687 S | 1/2015 | To et al. |
| D725,091 S | 3/2015 | Wen |
| D728,468 S | 5/2015 | Ferber et al. |
| 9,056,696 B1 | 6/2015 | Reyes |
| 9,060,580 B2 | 6/2015 | Tages |
| 9,098,238 B2 | 8/2015 | Richardson et al. |
| D740,798 S | 10/2015 | Poon et al. |
| D747,707 S | 1/2016 | Roberts et al. |
| D747,708 S | 1/2016 | Roberts et al. |
| D753,641 S | 4/2016 | Roberts et al. |
| D754,651 S | 4/2016 | Roberts et al. |
| D754,652 S | 4/2016 | Roberts et al. |
| D756,344 S | 5/2016 | Roberts et al. |
| D756,977 S | 5/2016 | Schriefer et al. |
| D756,978 S | 5/2016 | Addonisio |
| D757,702 S | 5/2016 | Kanazawa |
| D757,703 S | 5/2016 | Kanazawa |
| D757,704 S | 5/2016 | Roberts et al. |
| D763,841 S | 8/2016 | Kim |
| D772,854 S | 11/2016 | Igarashi |
| D775,615 S | 1/2017 | Tien |
| D776,100 S | 1/2017 | Igarashi |
| D776,645 S | 1/2017 | Del Moral et al. |
| D777,715 S | 1/2017 | Sawaya |
| 9,545,140 B1 | 1/2017 | Johnson et al. |
| D778,271 S | 2/2017 | Stump et al. |
| D779,470 S | 2/2017 | Kim et al. |
| 9,615,476 B2 | 4/2017 | Rayner et al. |
| D786,232 S | 5/2017 | Kim et al. |
| D789,344 S | 6/2017 | Kim |
| D805,064 S | 12/2017 | Lee et al. |
| 9,866,255 B1 | 1/2018 | Ketter-Muldrow |
| 9,872,546 B2 | 1/2018 | Kim |
| D814,453 S | 4/2018 | Chiang et al. |
| D816,551 S | 5/2018 | Leyrikh |
| D816,651 S | 5/2018 | Chiang et al. |
| 10,027,783 B2 | 7/2018 | Dukerschein et al. |
| 10,362,846 B2 | 7/2019 | Denike et al. |
| 10,441,044 B2 | 10/2019 | Chiang et al. |
| 2003/0150756 A1 | 8/2003 | Kajiya |
| 2004/0154941 A1 | 8/2004 | Montler |
| 2010/0096284 A1 | 4/2010 | Bau |
| 2012/0008880 A1 | 1/2012 | Toth |
| 2012/0043234 A1 | 2/2012 | Westrup |
| 2012/0067751 A1 | 3/2012 | Mongan et al. |
| 2012/0103844 A1 | 5/2012 | Piedra et al. |
| 2012/0261289 A1* | 10/2012 | Wyner .................. A45C 11/00 206/320 |
| 2012/0325720 A1 | 12/2012 | Tages et al. |
| 2013/0001105 A1 | 1/2013 | Mongan et al. |
| 2013/0105354 A1 | 5/2013 | Wyner et al. |
| 2013/0175186 A1 | 7/2013 | Simmer |
| 2013/0193006 A1 | 8/2013 | Bergreen et al. |
| 2014/0034531 A1 | 2/2014 | Wang |
| 2014/0069825 A1* | 3/2014 | Macrina ............... A45C 11/00 206/37 |
| 2014/0078671 A1 | 3/2014 | Hong |
| 2014/0116897 A1 | 5/2014 | Wilkey |
| 2014/0274232 A1 | 9/2014 | Tages |
| 2015/0060309 A1 | 3/2015 | Sartee et al. |
| 2015/0068935 A1* | 3/2015 | Kay ...................... A45C 13/36 206/320 |
| 2015/0076187 A1* | 3/2015 | Cohen .................. A45C 15/00 224/191 |
| 2015/0119118 A1 | 4/2015 | Ashley et al. |
| 2015/0129095 A1 | 5/2015 | Marin |
| 2015/0141095 A1 | 5/2015 | Kim |
| 2015/0195929 A1 | 7/2015 | Roberts et al. |
| 2015/0295617 A1 | 10/2015 | Lai et al. |
| 2015/0295618 A1 | 10/2015 | Johnson et al. |
| 2016/0015138 A1 | 1/2016 | Poon et al. |
| 2016/0058146 A1 | 3/2016 | Baker et al. |
| 2016/0094263 A1 | 3/2016 | Fathollahi |
| 2016/0113136 A1* | 4/2016 | Shin ..................... G06F 1/1626 361/679.01 |
| 2016/0157573 A1 | 6/2016 | Del Moral et al. |
| 2016/0295981 A1 | 10/2016 | Lay et al. |
| 2017/0187853 A1 | 6/2017 | Dukerschein et al. |
| 2017/0188676 A1 | 7/2017 | Denike et al. |
| 2018/0289122 A1 | 10/2018 | Lin |
| 2018/0332724 A1 | 11/2018 | Roberts et al. |
| 2019/0013832 A1 | 1/2019 | Mody et al. |

FOREIGN PATENT DOCUMENTS

| | | |
|---|---|---|
| WO | 2012149304 A1 | 11/2012 |
| WO | 2013129763 A1 | 9/2013 |

OTHER PUBLICATIONS

European Search Report for EP18193156 dated Jan. 18, 2019.

Incipio DualPro Case, posted at amazon.com, posting date not given, [online], [site visited Jul. 20, 2017]. Available from Internet,<URL: https://www.amazon.com/iPhoneIncipioDualProShockAbsorbing/dp/B01JPIBZUO>.

Lohasic 3-In-1 Case, posted at amazon.com, posting date not given, [online], [site visited Jul. 20, 2017]. Available from Internet, <URL: https://www.amazon.com/RoybensAntiScratchAntifingerprintShockproofElectroplate/dp/B01LMW06DG>.

OtterBox Symmetry Case, posted at amazon.com, posting date not given, [online], [site visited Jul. 20, 2017]. Available from Internet, <URL: https://www.amazon.com/OtterBoxSYMMETRYCaseiPhoneONL Y/dp/801 K6PB3XG/>.

Speck iPhone 7 Plus Presidio, posted at amazon.com, posting date Aug. 8, 2016, [online], [site visited Jul. 20, 2017]. Available from Internet, <URL: https://www.amazon.com/SpeckProductsPresidioPhoneiPhone/dp/B01 JRU57Y2>.

* cited by examiner

DUAL-LAYER BUMPER FOR A CASE FOR A MOBILE DEVICE

FIELD OF THE INVENTION

The present invention relates to a dual-layer bumper configured to attach to and cover a periphery of a case for a mobile device. The bumper has a hard inner layer and a soft outer layer, which soft outer layer may optionally include an antimicrobial material or an antimicrobial surface treatment.

Cases for mobile devices have been designed to provide at least some protection from impact events, such as when the device is dropped, hit, or otherwise struck. In order to provide such protection, materials are often employed which noticeably increase the thickness and weight of the case, and thus impact the portability and ease of use of the resultant protected device. One way to improve the impact protection of a case is to increase the amount of material in the case that provides the impact protection. But this increases the cost of the case in terms of materials, and further increases the size and weight of the case, which is undesirable to users.

But such cases may include openings that expose various features of the mobile device, thereby presenting the potential for these features to be damaged. In addition, such cases may not offer sufficient protection for all situations in which a mobile device may be used.

SUMMARY OF THE INVENTION

As such, it is desirable to provide a new bumper configure to fit onto a case for a mobile device which can provide protection for most external features of the device as well as increased shock/impact protection to the mobile device without adding significantly to the cost, size, or weight of the case.

According to the present invention there is therefore provided a bumper for a mobile device case as described by way of example below and in the accompanying claims.

In one embodiment of the invention there is provided a bumper (1) for a mobile device that includes a first layer (18) formed from an elastomeric first material and a second layer (2) formed from a second material different from the elastomeric first material. The first layer (18) is arranged on an outside of the bumper and the second layer (2) is arranged on an inside of the bumper so that the second layer (2) is between the mobile device and the first layer (18) when the mobile device is arranged in the bumper (1). The bumper (1) completely covers the mobile device, except for at least a portion of the front, at least a portion of the rear, and at least one speaker of the mobile device if present, when the mobile device is arranged in the bumper (1).

In another embodiment, at least one outer surface of the first layer (18) includes an antimicrobial substance or treatment.

In yet another embodiment, the at least one outer surface of the first layer (18) includes an antimicrobial substance selected from the group consisting of silver and silver alloys, copper and copper alloys, organosilanes, quaternary ammonium compounds, chlorhexidine, chlorhexidine incorporated hydroxyapatite materials, chlorhexidine-containing polymers, and antibiotics.

In a further embodiment, at least part of the at least one outer surface of the first layer (18) is a superhydrophobic surface on which water has a contact angle of >150°.

In yet a further embodiment, the elastomeric first material comprises at least one material selected from the group consisting of thermoplastic elastomers ("TPEs"), thermoplastic polyurethane ("TPU"), silicone, rubber, and combinations thereof.

In another embodiment, the elastomeric first material comprises silicone.

In yet another embodiment, the second material comprises at least one material selected from the group consisting of hardened plastic materials, rigid or semi-rigid plastic materials, rigid rubber materials, polycarbonate materials, metals, alloys, para-aramid materials, wood, glass, mirror, quartz, and combinations thereof.

In a further embodiment, the second layer (2) comprises a flange or extension (21) that covers a portion of a front of a mobile device when arranged in the bumper (1) without covering a screen or any buttons or other features that operate the mobile device.

In yet a further embodiment, the first layer (18) forms a first lip or rim (20) so as to secure and retain the mobile device when arranged within the case bumper (1).

In another embodiment, the first lip or rim (20) is arranged on a rear side of the bumper (1) corresponding to a rear side of the mobile device when arranged within the case bumper (1).

In yet another embodiment, the second layer (2) is not arranged between the first lip or rim (20) and the mobile device when arranged within the case bumper (1).

In a further embodiment, the second layer (2) forms a second lip or rim (19) so as to secure and retain the mobile device when arranged within the bumper (1).

In yet a further embodiment, the second lip or rim (19) is arranged on a front side of the bumper (1) corresponding to a front screen-side of the mobile device when arranged within the case bumper (1).

In another embodiment, the bumper (1) further includes a front-side inner surface (23) configured to be spaced from the mobile device so that a gap is formed between the front-side inner surface (23) and a front screen-side outer surface of the mobile device when arranged in the bumper (1), the gap being in a direction perpendicular to the front screen-side outer surface of the mobile device.

In yet another embodiment, a front-side inner surface (23) of the flange or extension (21) is configured to be spaced from the mobile device so that a gap is formed between the front-side inner surface (23) and a front screen-side outer surface of the mobile device when arranged in the bumper (1), the gap being in a direction perpendicular to the front screen-side outer surface of the mobile device.

In a further embodiment, a front-side inner surface (23) of the second lip or rim (19) is configured to be spaced from the mobile device so that a gap is formed between the front-side inner surface (23) and a front screen-side outer surface of the mobile device when arranged in the bumper (1), the gap being in a direction perpendicular to the front screen-side outer surface of the mobile device.

In another embodiment, the bumper (1) further includes a first side (9), a second side (10), a third side (7), and a fourth side (8). The first side (9) has an inside surface and an outside surface opposite to the inside surface. The second side (10) has an inside surface and an outside surface opposite to the inside surface. The third side (7) has an inside surface and an outside surface opposite to the inside surface. And the fourth side (8) has an inside surface and an outside surface opposite to the inside surface. The inside surface of the first side (9) faces toward the inside surface of the second side (10). The inside surface of the third side (7) faces toward the inside surface of the fourth side (8). The first and second sides (9,10) are arranged between the third and fourth sides (7,8), and the third and fourth sides (7,8) are arranged between the first and second sides (9,10), so that the first, second, third, and fourth sides (9,10,7,8) form at least part of a frame configured to surround a periphery of the mobile device when the mobile device is arranged inside the bumper (1). The first layer (18) forms at least part of each of the outside surfaces of the first, second, third, and fourth sides (9,10,7,8) so that they all include the antimicrobial substance or treatment.

In yet another embodiment, the second layer (2) forms at least a part of the inside surface of each of the first, second, third, and fourth sides (9,10,7,8).

It is noted that the features of the above-described embodiments are not exclusive to each other, and that any one of the above embodiments/features can be combined with one or more of the other embodiments/features to arrive at further embodiments.

The inventive bumper can be designed to fit cases for a variety of mobile devices—such as smartphones and other portable electronic devices.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments. It is noted that any numerical ranges disclosed herein are included to individually disclose every sub-range and number, both whole integer and partial fraction, within the disclosed range. For example, a disclosed range of 1-100 is intended to individually disclose 20-90, 40-80, 30.5-50.2, 20, 67.3, 84.512924, and every other range and number that falls within the recited range.

FIGS. 1-7 show an upper side view, a rear view, a right side, a left side view, a lower side view, a front view, and a front-right perspective view, respectively, of the bumper 1 in accordance with an embodiment of the invention. The bumper 1 includes a first layer 18 and a second layer or shell 2. A rear side of the bumper has an opening 17 so that the bumper 1 can be fitted onto a case 100 for a mobile device. The first layer 18 has upper side 7, a lower side 8, a left side 9, and a right side 10 extend from the rear side toward a front of the bumper 1 so as to form a frame in which the second layer 2 will be—and eventually the mobile device case 100 can be—arranged. The second layer 2 also includes one or more of corresponding upper, lower, left, and right sides.

In one embodiment, the respective upper sides, lower sides, left sides, and right sides of the first layer 18 and second layer 2 are substantially coextensive with each other so that the respective upper sides, lower sides, left sides, and right sides of each layer covers at least 50% of the surface area of the corresponding side of the other layer.

According to another embodiment, the respective upper sides, lower sides, left sides, and right sides of the first layer 18 and second layer 2 are only partially coextensive with each other so that the respective upper sides, lower sides, left sides, and right sides of the first layer 18 cover only a portion of the respective sides of the second layer 2.

The second layer or shell 2 is preferably formed from a rigid or hard material to create a rigid/hard shell which provides at least some impact protection as well as protection from being punctured by impacts with sharp objects. Examples of suitable hard/rigid materials include hardened plastic material, a rigid or semi-rigid plastic material, a rigid/hard rubber material, a polycarbonate material, a metal, an alloy, a para-aramid material, wood, glass, mirror, quartz, and any combination thereof, and may be any color or texture. Preferred materials include thermosetting plastics with a hard durometer having shore 30D to shore 100D, polycarbonate, poly(methyl methacrylate) ("PMMA"), metals, acrylonitrile butadiene styrene ("ABS"), PMMA, polyethylene terephthalate ("PET"), high durometer thermoplastic elastomers ("TPEs") and thermoplastic polyurethanes ("TPUs") having shore 30D to shore 100D, and any combination thereof. Preferably, the hard/rigid material of the shell 2 is nonelastomeric. The hard protective shell may be designed to mimic the finish of existing mobile devices, such as phones, MP3/4 players, tablets, laptops, and other mobile electronic devices. The second layer 2 may additionally be formed with a lip or rim 19 so as to secure and retain the mobile device case 100 within the bumper 1. The second layer 2 may also be formed with a flange or extension 21 that covers a portion of a front of a mobile device without covering the screen or any buttons or other features that operate the mobile device so as to provide additional protection to a mobile device arranged in the bumper 1 without obscuring the screen or preventing any features of the mobile device from being activated.

The outside surface of the first layer 18 may be provided with a scratch resistant UV hardcoat, which resists scratches and prevents discoloration of the case due to UV exposure.

The first layer 18 is preferably formed from a soft elastomeric material which provides at least some shock protection from impact events such as drops or falls. Examples of suitable materials include thermoplastic elastomers ("TPEs"), thermoplastic polyurethane ("TPU"), polyolefins, silicone, rubber, and any combination thereof. Forming the first layer 18 from a soft elastomeric material provides the case with an extra layer of protection in the event of drop, fall, or other impact event. The elastomeric first layer 18 also makes the case easier for a user to grip and hold compared to a rigid or hard outer shell, making it less likely that a user will drop the device case 100.

The first layer 18 may also have an antimicrobial material coated on one or more surfaces (e.g., one or more exterior surfaces of the first layer 18 facing away from the mobile device case 100) or embedded within the layer.

Examples of antimicrobial materials include silver or silver alloy (e.g., silver sodium hydrogen zirconium phosphate), copper or copper alloy, organosilanes, quaternary ammonium compounds (e.g., dimethyloctadecyl (3-trimethoxysilyl propyl) ammonium chloride, alkyldimethylbenzylammonium chloride, and didecyldimethylammonium chloride), chlorhexidine, chlorhexidine incorporated hydroxyapatite materials, chlorhexidine-containing polymers (e.g., chlorhexidine-containing polylactide), and antibiotics (e.g., gentamicin, cephalothin, carbenicillin, amoxicillin, cefamandol, tobramycin, vancomycin).

Examples of antimicrobial coatings include coatings containing one or more of the above antimicrobial materials, chlorhexidine-containing polylactide coatings on an anodized surface, and polymer and calcium phosphate coatings with chlorhexidine.

In addition, or alternatively, the first layer 18 may include an antimicrobial surface treatment. For example, one or more surfaces (e.g., one or more exterior surfaces of the first layer 18 facing away from the mobile device case 100) may be formed as or made to be a superhydrophobic surface—such as a low energy, generally rough surface on which water has a contact angle (i.e., the angle at which the liquid—vapor interface meets the solid-liquid interface) of >150°.

Preferably the first layer 18 is made from liquid injections silicone and has an antimicrobial coating on one or more, preferably all, outer surfaces facing away from a mobile device case 100 arranged within the bumper 1. This helps to keep the outside of the bumper 1 clean and reduce/minimize the presence of microbes (e.g., bacteria, fungi, viruses, etc.), thereby helping to prevent the hand-to-hand spread of related sicknesses, illnesses, or diseases.

Figure 1:
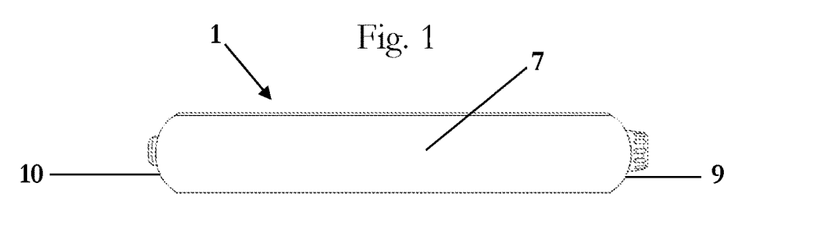
FIG. 1 is an upper side view of the bumper in accordance with an embodiment of the invention.
Figure 2:
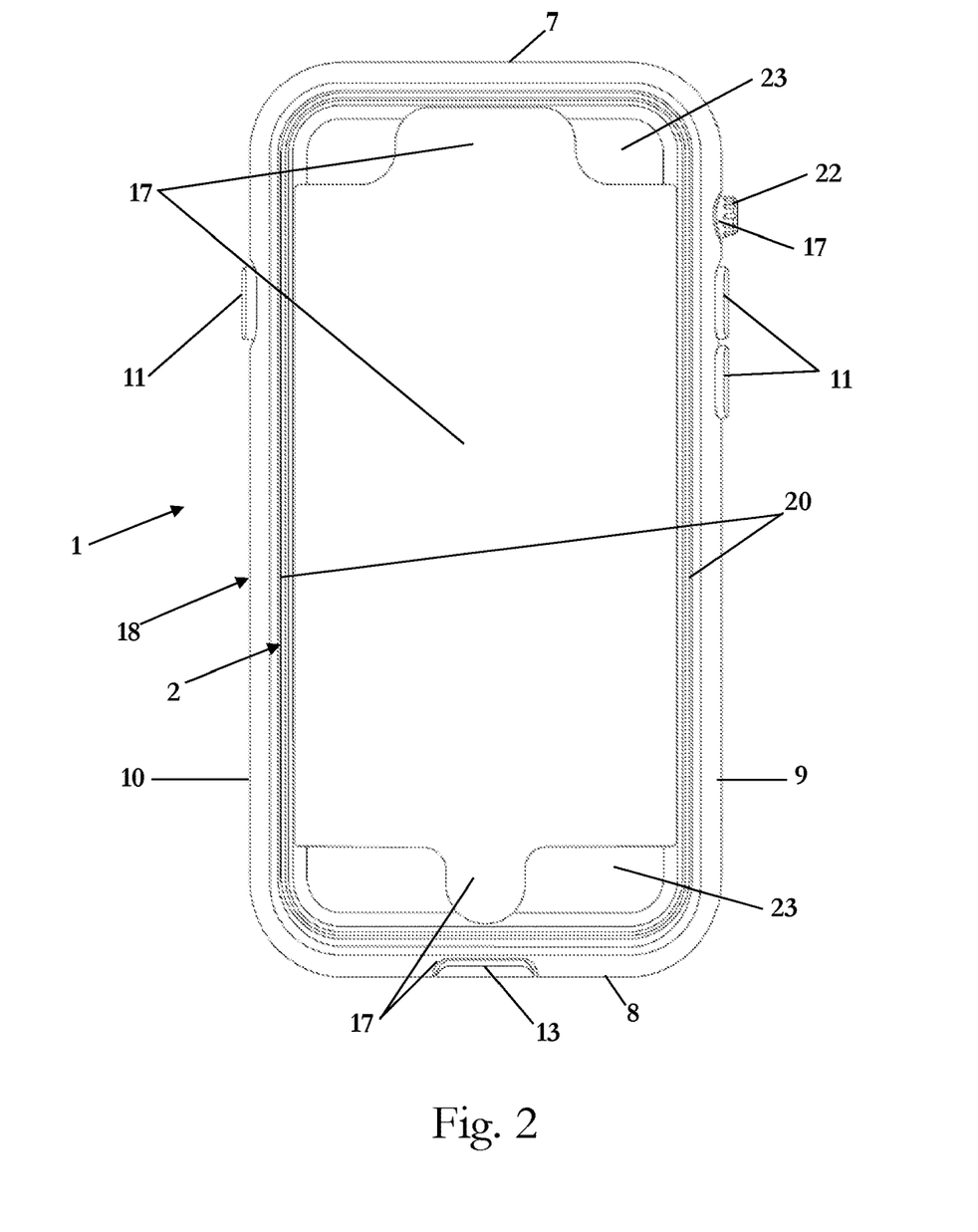
FIG. 2 is a rear view of the bumper in accordance with an embodiment of the invention.
Figure 3:
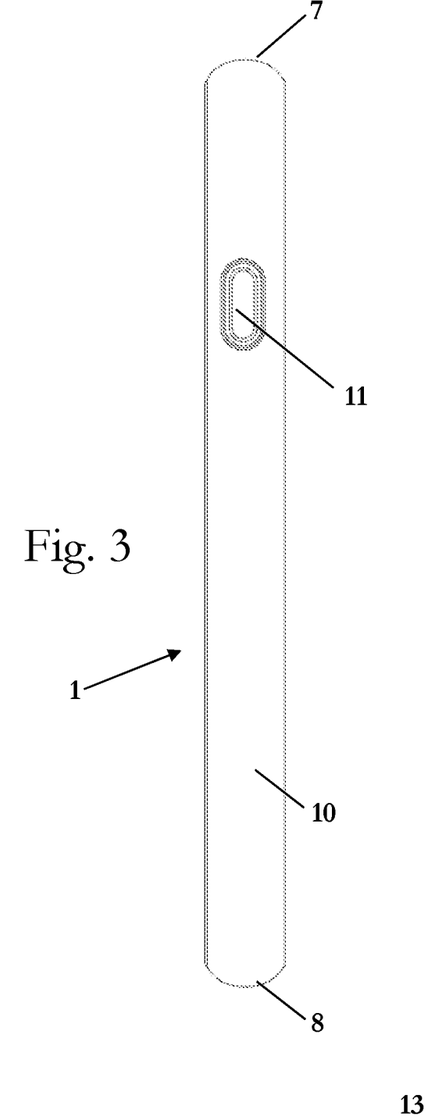
FIG. 3 is a right side view of the bumper in accordance with an embodiment of the invention.
Figure 4:
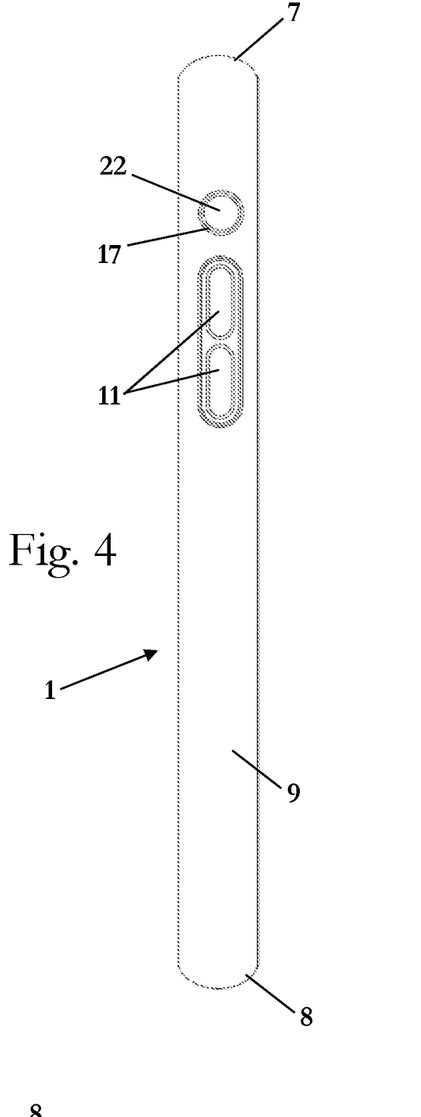
FIG. 4 is a left side view of the bumper in accordance with an embodiment of the invention.
Figure 5:
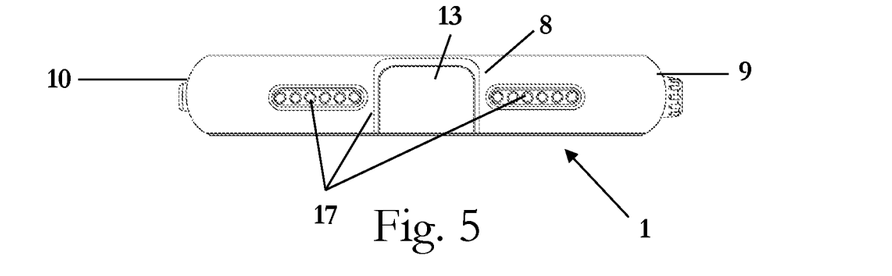
FIG. 5 is a lower side view of the bumper in accordance with an embodiment of the invention.
Figure 6:
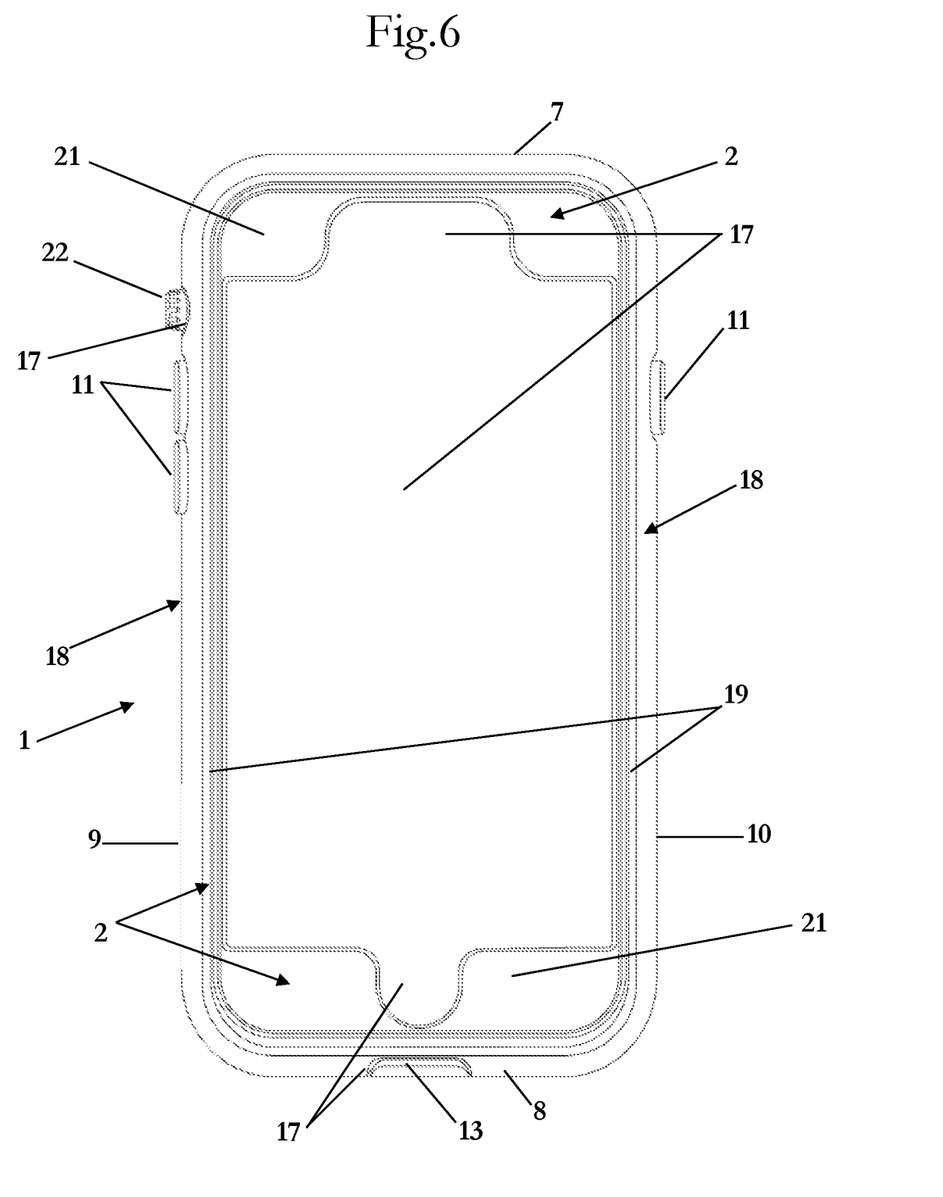
FIG. 6 is a front view of the bumper in accordance with an embodiment of the invention.
Figure 7:
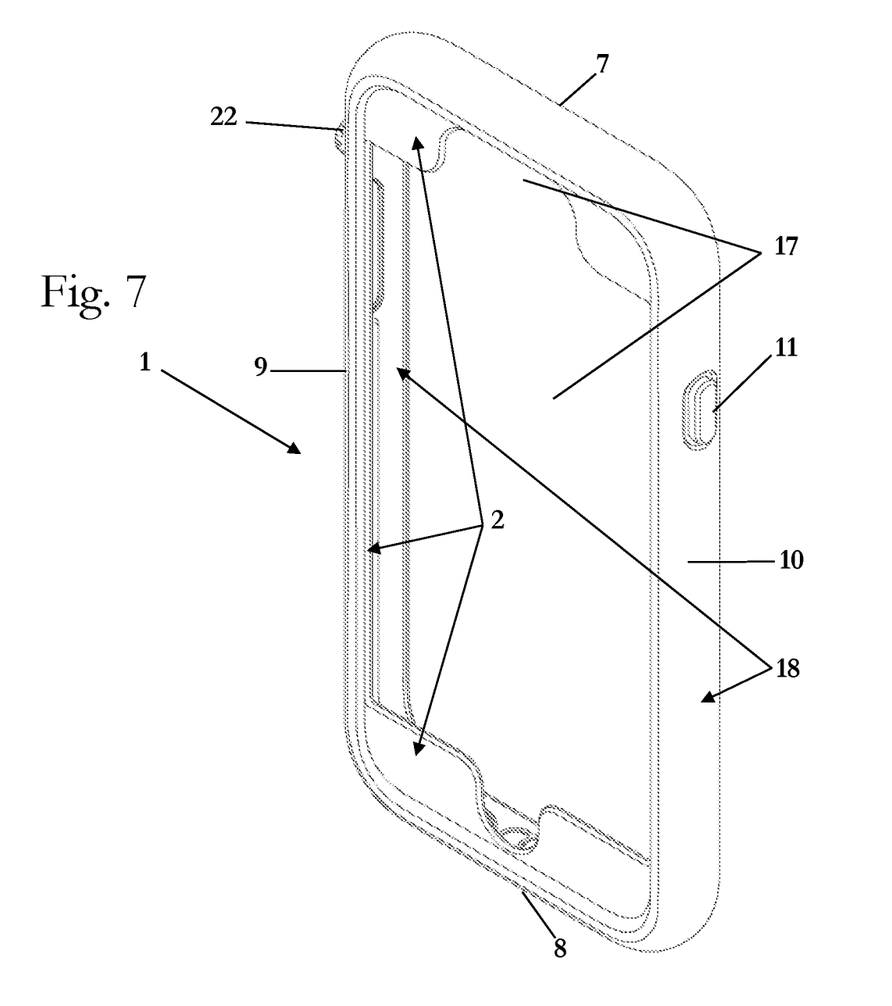
FIG. 7 is a front-right perspective view of the bumper in accordance with an embodiment of the invention.
Figure 8:
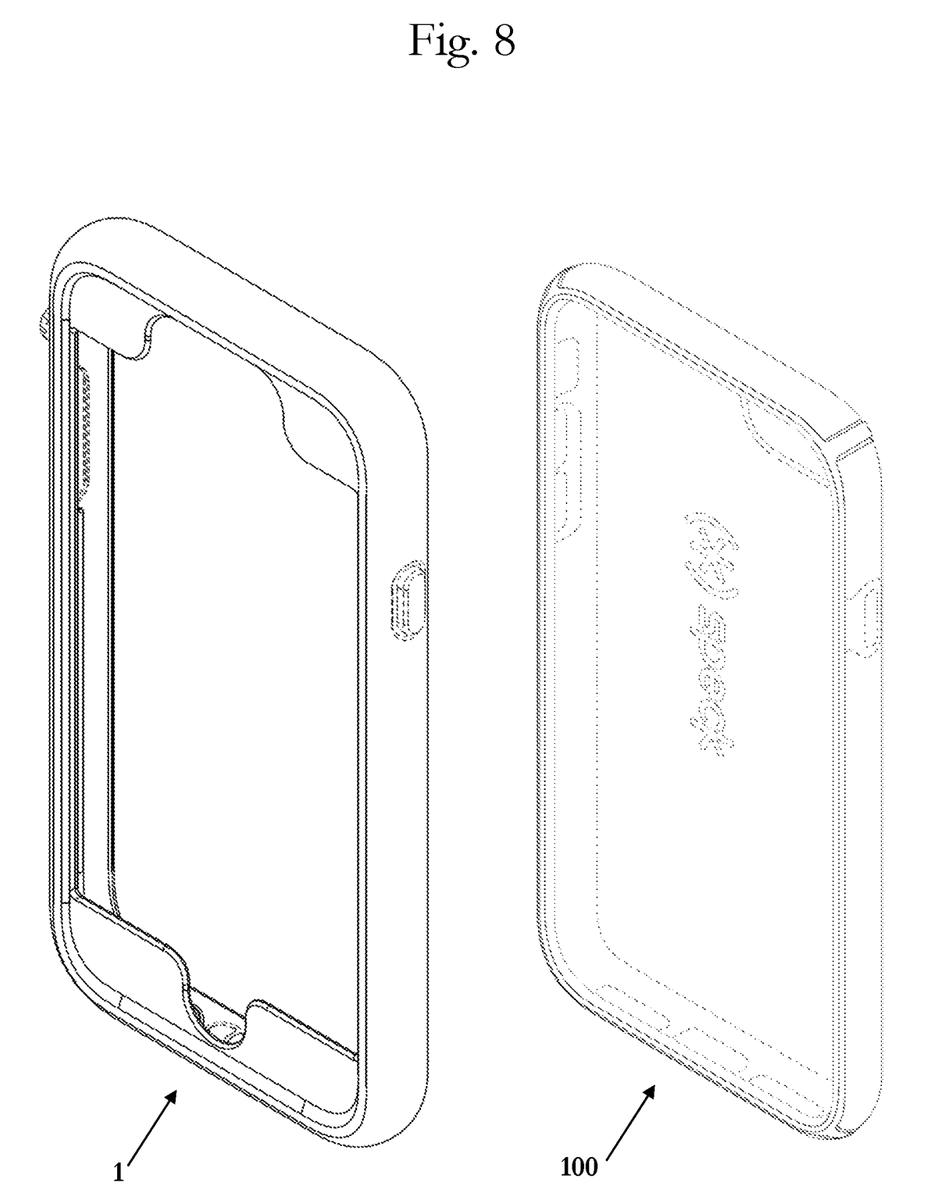
FIG. 8 is a view of the bumper accordance with an embodiment of the invention before it is fitted onto a case for a mobile device.

The first layer 18 and second layer 2 may also be designed so that there are no gaps between the peripheral sides of the mobile device case 100 and the inside surfaces of the bumper 1. This enables the bumper 1 to have a very solid connection to the case 100. The first layer 18 may additionally be formed with a lip or rim 20 so as to secure and retain the mobile device case 100 within the bumper 1. The elastomeric layer 18 also can be formed to have portions 11 designed to cover buttons on a mobile device. This allows a user to simply press the exposed portion 11 of the outer elastomeric layer 18 corresponding to the desired input of the mobile device. And the elastomeric first layer 18 may be formed to have one or more gaskets 13 around or covering one or more corresponding openings 17. For example, as shown in FIGS. 2, 5, and 6, the first layer 18 can have a gasket 13 that covers an opening 17 for a charging port, audio port, data port, or other electrical port of the mobile device. The gasket 13 may opened to provide access to the corresponding port, and closed to protect the port from physical damage and to prevent dust and debris from getting into the port.

The bumper 1 may also include a cover or knob 22 to cover one or more openings 17. For example, the case 1 can include a knob 22 that covers an opening 17 for a switch on the mobile device. The knob 22 can be rotated to activate the switch underneath. This protects the switch from physical damage and prevents dust and debris from getting into the bumper 1, and the case 100 inside, while still allowing a user to easily manipulate the switch.

In an especially preferred embodiment, all openings 17 in the bumper 1, other than the opening for the screen of the mobile device and the opening in the rear of the bumper 1 for the case 100, are covered by a gasket 13 or a cover 22. This provides protection for all exposed features (e.g., ports, switched, buttons, etc.) of a mobile device when it is arranged in the bumper 1.

In addition, the bumper 1 may be formed so that an inside surface 23 of the bumper 1 is spaced away from a front screen-side surface of a mobile device when it is arranged in the bumper 1 so as to form a gap between the front screen-side surface of the mobile device and the inside surface 23 of the bumper 1. For example, this inside surface 23 can be formed by an inside surface of the lip or rim 19, or by an inside surface of the flange or extension 21 as shown in FIG. 2. The gap formed between the front screen-side surface of the mobile device and the inside surface 23 of the bumper 1 is sufficient to allow a screen protector—even thicker protectors made of glass and glass-like materials—to be arranged on the front of the mobile device between the mobile device and the bumper 1. Preferably this gap is 0.05 mm to 0.50 mm. More preferably, this gap is 0.10 mm to 0.50 mm. Most preferably, this gap is 0.25 mm to 0.40 mm.

The first layer 18 may also, or alternatively, be formed from a non-Newtonian dilatant material. The dilatant material is soft and flexible when at rest, but stiffens and/or hardens upon impact. In this way, the dilatant material is able to provide both impact protection by dispersing the force of an impact event along the surface of the second layer-42, and shock protection by absorbing some of the shock force of the impact event. This dual quality (i.e., absorbing and diffusing impact or impact forces) of the dilatant material allows for less material to be used to make the case—allowing for a thinner, lighter, and less bulky case which increases the portability of the protected mobile device—while still providing increased impact and shock protection to the mobile device encased therein.

Examples of suitable dilatant materials for the first layer 18 include materials made by D3O® (such as D3O® ST, D3O® XT, D3O® Shock+, and D3O® Aero), PORON® XRD™ made by Rogers Corporation, and ARTi-LAGE™ artificial cartilage foam made by ARTiLAGE™. Impact absorbing materials (such as foams) which have dilatant properties are especially preferred.

The dilatant material may have a hardness of at least 20 Shore OO, or may have a hardness of at least 5 Shore O. Preferably the hardness is at least 30 Shore OO, at least 50 Shore OO, at least 60 Shore OO, or at least 70 Shore OO. More preferably the hardness is in a range of 20-90 Shore OO, or in a range of 5-61 Shore O. More preferably still, the hardness is in a range of 30-80 Shore OO, or in a range of 5-40 Shore O. Even more preferably, the hardness is in a range of 40-70 Shore OO.

Preferably the first layer 18 has a hardness in the range of from 60-85 Shore A. If the first layer 18 is clear, its preferred hardness is 75-85 Shore A. If the first layer 18 is opaque, its preferred hardness is 60-75 Shore A.

Each of the first layer 18 and the second layer 2 is 0.5-4.0 mm thick. Preferably one or more of the layers is 0.6-3.0 mm thick. More preferably, one or more of the layers is 0.8-2.0 mm thick. Even more preferably, one or more of the layers is 0.9-1.3 mm thick.

The first layer 18 and second layer 2 may be co-molded/co-casted together or otherwise permanently affixed to each other, such as with an adhesive.

Alternatively, the first layer 18 and second layer 2 may be separable from one another as two distinct pieces. In such an instance, the two layers can be configured so that they mechanically engage with each other to form a unitary case. For example, opposite sides of the first layer 18 (e.g., upper side 7 and lower side 8, left side 9 and right side 10, or both) may be designed to snap onto and hold the second layer 2.

For example, one process for producing the case may be:
1. Mold the first layer 18; and
2. Place the first layer 18 into the overmold tool, and mold the second layer 2 onto the first 18 2.

Another example of a process for producing the case may be:
1. Mold the second layer 2; and
2. Place the second layer 2 into the overmold tool, and mold the first layer 18 onto the second layer 2.

Yet another example of a process for producing the case may be:
1. Mold the first layer 18;
2. Mold the second layer 2 (separately from, and before, after, or simultaneously with, the first layer 18); and
3. Join together the first layer 18 and the second layer 2.

It is noted that additional openings or cutouts 17 may be provided in at least a part of the case 1 so as to allow various buttons, ports, or features of a protected mobile device to be accessed without having to remove the mobile device case 100 from the case 1. For example openings or cutouts 17 may be provided to allow a user to engage a button of the protected mobile device either directly or via the cover portion 11. As another example, cutouts 17 may be provided to create an opening in the case 1 though which a charging port, audio port, data port, or other electrical port of the mobile device may be accessed, either directly or via a pass-through connection. As yet another example, cutouts 17 may be provided to create an opening to expose a camera lens, audio speaker, microphone, or other feature of the device to be accessed or employed without removing the mobile device from the case 1.

While the embodiments of the bumper 1 shown in the drawing are made from the two layers 2, 3, it can also be made of a single layer 3 that forms both the interior and exterior of the bumper 1.

And while the embodiments of the bumper 1 described above and shown in the drawing are configured to fit around a mobile device case 100, the bumper 1 could be configured to fit directly around a mobile device itself without an intervening case 100.

It is noted that the terminology used above is for the purpose of reference only, and is not intended to be limiting. For example, terms such as "upper", "lower", "above", "below", "rightward", "leftward", "clockwise", and "counterclockwise" refer to directions in the drawings to which reference is made. As another example, terms such as "inward" and "outward" may refer to directions toward and away from, respectively, the geometric center of the component described. As a further example, terms such as "front", "rear", "side", "left side", "right side", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

In addition, it is noted that citation or identification of any document in this application is not an admission that such document is available as prior art to the present invention.

The invention claimed is:

1. A case assembly for a mobile device, comprising:
   a case configured for receiving a mobile device therein; and
   a bumper configured for removably fitting around the case, the bumper comprising:
   a first layer formed from an elastomeric first material; and
   a second layer attached to the first layer and formed from a second material different from the elastomeric first material and comprising a flange or extension that covers a first portion of a front of the mobile device when the mobile device is arranged in the bumper,
   wherein the first layer is arranged to define at least a portion of an outside of the bumper and the second layer is arranged to define at least a portion of an inside of the bumper so that the second layer is between the mobile device and the first layer when the mobile device is arranged in the bumper,
   wherein the bumper completely covers the mobile device, except for at least a second portion of the front and at least a portion of a rear of the mobile device, when the mobile device is arranged in the bumper,
   wherein a front-side inner surface of the flange or extension is configured to be spaced from the mobile device so that a first gap is formed between the front-side inner surface and a front screen-side outer surface of the mobile device when the mobile device is arranged in the bumper, the first gap being in a direction perpendicular to the front screen-side outer surface of the mobile device, and
   wherein at least a portion of the case is between the bumper and the mobile device when the mobile device is arranged in the bumper.

2. The case assembly for a mobile device according to claim 1, wherein the flange or extension covers the first portion of the front of the mobile device when the mobile device is arranged in the bumper without covering a screen or any buttons or other features on the front screen-side outer surface of the mobile device that operate the mobile device.

3. The case assembly for a mobile device according to claim 1, wherein the bumper is configured for exposing at least one speaker of the mobile device.

4. The case assembly for a mobile device according to claim 1,
   wherein the flange or extension covers the first portion of the front of the mobile device when the mobile device is received in the case and the bumper is fitted around the case,
   wherein the first layer is arranged to define at least the portion of the outside of the bumper and the second layer is arranged to define at least the portion of the inside of the bumper so that the second layer is between the mobile device and the first layer when the mobile device is received in the case and the bumper is fitted around the case.

5. A mobile device assembly, comprising:
   the case assembly for a mobile device according to claim 1; and a mobile device received in the case, wherein the bumper is fitted around the case.

6. The mobile device assembly according to claim 5, wherein the first gap is in the range from 0.05 mm to 0.50 mm.

7. The case assembly for a mobile device according to claim 1, wherein at least one outer surface of the first layer includes an antimicrobial substance or treatment.

8. A case assembly for a mobile device, comprising:
a case configured for receiving a mobile device therein; and
a bumper configured for removably fitting around the case, the bumper comprising:
a first layer formed from an elastomeric first material; and
a second layer permanently affixed to the first layer and formed from a second material different from the elastomeric first material,
wherein the second layer forms a first lip or rim so as to secure and retain the case within the bumper when the bumper is fitted around the case, the first lip or rim being arranged on a front side of the bumper corresponding to a front screen-side of the mobile device and being configured for extending over a portion of the front screen-side of the mobile device when the mobile device is arranged in the bumper,
wherein the first layer is arranged to define at least a portion of an outside of the bumper and the second layer is arranged to define at least a portion of an inside of the bumper so that the second layer is between the mobile device and the first layer when the mobile device is received in the case and the bumper is fitted around the case, and
wherein at least a portion of the case is between the bumper and the mobile device when the mobile device is received in the case and the bumper is fitted around the case.

9. The case assembly for a mobile device according to claim 8, wherein at least one outer surface of the first layer includes an antimicrobial substance or treatment.

10. The case assembly for a mobile device according to claim 9, further comprising:
a first side with an inside surface and an outside surface opposite to the inside surface;
a second side with an inside surface and an outside surface opposite to the inside surface;
a third side with an inside surface and an outside surface opposite to the inside surface; and
a fourth side with an inside surface and an outside surface opposite to the inside surface,
wherein the inside surface of the first side faces toward the inside surface of the second side,
wherein the inside surface of the third side faces toward the inside surface of the fourth side,
wherein the first and second sides are arranged between the third and fourth sides, and the third and fourth sides are arranged between the first and second sides, so that the first, second, third, and fourth sides form at least part of a frame configured to surround a periphery of the mobile device when the mobile device is arranged in the bumper, and
wherein the first layer forms at least part of each of the outside surfaces the first, second, third, and fourth sides so that all of the outside surfaces of the bumper include the antimicrobial substance or treatment.

11. The case assembly for a mobile device according to claim 10, wherein the second layer forms at least a part of the inside surfaces of each of the first, second, third, and fourth sides.

12. The case assembly for a mobile device according to claim 8, wherein at least one outer surface of the first layer includes an antimicrobial substance selected from the group consisting of silver and silver alloys, copper and copper alloys, organosilanes, quaternary ammonium compounds, chlorhexidine, chlorhexidine incorporated hydroxyapatite materials, chlorhexidine-containing polymers, and antibiotics.

13. The case assembly for a mobile device according to claim 8, wherein at least part of at least one outer surface of the first layer is a superhydrophobic surface on which water has a contact angle of >150°.

14. The case assembly for a mobile device according to claim 8, wherein the elastomeric first material comprises at least one material selected from the group consisting of thermoplastic elastomers ("TPEs"), thermoplastic polyurethane ("TPU"), silicone, rubber, and combinations thereof.

15. The case assembly for a mobile device according to claim 14, wherein the elastomeric first material comprises silicone.

16. The case assembly for a mobile device according to claim 8, wherein the second material comprises at least one material selected from the group consisting of hardened plastic materials, rigid or semi-rigid plastic materials, rigid rubber materials, polycarbonate materials, metals, alloys, para-aramid materials, wood, glass, mirror, quartz, and combinations thereof.

17. The case assembly for a mobile device according to claim 8, wherein the first layer forms a second lip or rim so as to secure and retain the case within the bumper when the bumper is fitted around the case.

18. The case assembly for a mobile device according to claim 17, wherein the second lip or rim is arranged on a rear side of the bumper corresponding to a rear side of the mobile device when the mobile device is arranged in the bumper.

19. The case assembly for a mobile device according to claim 17, wherein the second layer is not arranged between the second lip or rim and the mobile device when the mobile device is arranged in the bumper.

20. A mobile device assembly, comprising:
the case assembly for a mobile device according to claim 8; and
a mobile device received in the case, wherein the bumper is fitted around the case.

* * * * *